(12) United States Patent
Dinh et al.

(10) Patent No.: US 7,016,959 B2
(45) Date of Patent: Mar. 21, 2006

(54) SELF SERVICE SINGLE SIGN ON MANAGEMENT SYSTEM ALLOWING USER TO AMEND USER DIRECTORY TO INCLUDE USER CHOSEN RESOURCE NAME AND RESOURCE SECURITY DATA

(75) Inventors: Hung T. Dinh, Round Rock, TX (US); Jerry Andrew Gilkey, Raleigh, NC (US); Patrick M. Goal, Austin, TX (US); Mansoor A. Lakhdhir, Austin, TX (US); Reddy Nadrendra, Austin, TX (US); Ky Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 10/121,876

(22) Filed: Apr. 11, 2002

(65) Prior Publication Data
US 2003/0195970 A1    Oct. 16, 2003

(51) Int. Cl.
*G06F 15/173* (2006.01)
(52) U.S. Cl. .................. 709/225; 709/229; 713/182
(58) Field of Classification Search ............... 709/229, 709/225; 713/182, 183, 184, 185, 186
See application file for complete search history.

(56) References Cited

U.S. PATENT DOCUMENTS

| | | | | |
|---|---|---|---|---|
| 5,241,594 A | * | 8/1993 | Kung ........................ | 713/151 |
| 5,701,458 A | * | 12/1997 | Bsaibes et al. ............... | 707/9 |
| 5,768,503 A | * | 6/1998 | Olkin ........................ | 713/201 |
| 5,768,504 A | | 6/1998 | Kells et al. ................. | 713/201 |
| 5,944,824 A | * | 8/1999 | He ............................ | 713/201 |
| 5,961,593 A | * | 10/1999 | Gabber et al. .............. | 709/219 |
| 6,105,027 A | * | 8/2000 | Schneider et al. ............ | 707/9 |
| 6,161,139 A | | 12/2000 | Win et al. .................... | 709/225 |
| 2001/0054155 A1 | * | 12/2001 | Hagan et al. ............... | 713/193 |
| 2002/0078386 A1 | * | 6/2002 | Bones et al. ................ | 713/202 |
| 2002/0158949 A1 | * | 10/2002 | Ujita et al. .................... | 347/86 |
| 2003/0040995 A1 | * | 2/2003 | Daddario et al. ............ | 705/35 |
| 2003/0195970 A1 | * | 10/2003 | Dinh et al. .................. | 709/229 |

\* cited by examiner

*Primary Examiner*—Le Hien Luu
(74) *Attorney, Agent, or Firm*—John Biggers; Mark S. Walker; Biggers & Ohanian, LLP

(57) ABSTRACT

A method for directory enabled, self service, single sign on user account management, the method implemented in conjunction with a directory, the directory comprising resource directory entries and user directory entries. Exemplary embodiments include receiving, from a user through a browser, an SSO user ID and SSO password of the user, the SSO password being known only to the user, retrieving from the directory, in dependence upon the SSO user ID and SSO password, a user directory entry for the user, and creating, in dependence upon the user directory entry, a new mapping of a resource to the SSO user ID.

15 Claims, 4 Drawing Sheets

SELF SERVICE SINGLE SIGN ON MANAGEMENT SYSTEM ALLOWING USER TO AMEND USER DIRECTORY TO INCLUDE USER CHOSEN RESOURCE NAME AND RESOURCE SECURITY DATA

BACKGROUND OF THE INVENTION

1. Field of the Invention

The field of the invention is data processing, or, more specifically, methods, systems, and products for directory enabled, self service, single sign on user account management.

2. Description of Related Art

Systems in present art provide single sign on services for users. One example of such a system is the IBM Secure Way Policy Director ("PD") Single Sign On ("SSO") solution which allows users access to resources, such as secure URIs requiring user authentication, regardless of the location of the resource, and the user's credentials (resource user ID and resource password) for that resource, all of which is accomplished using only one initial login with SSO logon credential, an SSO user ID and an SSO logon password. After an initial web browser login challenge to receive and verify the SSO logon credentials, any further login challenges or requirements, from different back-end servers or other means for accessing resources, are handled transparently for the user.

The usual transaction flow for SSO solution, again using the IBM PD SSO solution as an example of an SSO production environment, is normally as follows:

1) A browser user's request for access to a resource based upon a resource name is sent to a network dispatcher, a tcp/ip switch in this example, typically behind an enterprise firewall.
2) The network dispatcher forwards the request to an IBM PD/WebSEAL Server, a web server capable of resolving, into actual resource addresses, requests for resource access based upon resource names.
3) The web server, PD/WebSEAL, validates the browser user's SSO credentials.
4) The web server, PD/WebSEAL, resolves the resource name into an actual resource address and retrieves security credentials for access to the requested resource.
5) PD/WebSEAL sends the resource request to a back-end server or an application identified by the resource address along with the resource credentials.
6) The back-end server or application validates the resource credentials, returning a webpage HTML stream corresponding to the requested resource.
7) PD/WebSEAL forwards the webpage HTML stream to the browser.

In such a system, it is expected that a URI presented to a front-end server such as IBM's PD/WebSEAL, is to be interpreted by the server as a conventional URI containing a resource name that will not resolve directly to a network address and storage location. An additional interim step is required for full address resolution. That is, the front-end server uses the resource name from the URI as a search parameter to retrieve the actual address from a directory service such as an LDAP service or an X.500 service.

For all of this to work seamlessly, the PD System Administrators must handle all of the user management. User management includes all mappings of users' existing resource credentials, for all the various back-end servers and resources, to users' SSO IDs. Such a mapping effort can be a huge task for PD System Administrators and may require hiring many PD System Administrators.

More specifically, in typical examples of prior art, the PD System Admins have to perform the following tasks in mapping resource credentials to SSO IDs:

Define names of resources. In the case of the IBM PD example, defining resource names in accomplished by using the ivadmin command to define resource names. For example, the resource named 'app1' can be named by:

ivadmin>rsrc create app1 -desc "for mapping id resource test"

Create a smart junction between the PD/WebSeal server and a back-end server. A smart junction is a tcp/ip connection between a front end PD/WebSEAL server and a back-end server. A smart junction allows PD/WebSEAL to provide protective services on behalf of the back-end server.

The junctioncp command is used to create the junction: junctioncp>create-t tcp-h hostname options junctionpoint junctioncp>create-t tcp-h www.developer.ibm-.com -b gso-T app1-j/app1_junction Manually map existing resource names, ids, and passwords to each SSO ID. This can be done either by graphical user interface menu system, such as, in the of the IBM PD, the ivconsole command, or through character command lines as for example the ivadmin command. This is a very time consuming task. For example, to map the resource having userid=AA00bb and password=footprint to the SSO id=David and then associate them to the resource named 'app1' requires this ivadmin syntax:

ivadmin>rsrccred create app1 rsrcuser AA00bb rsrcpwd footprint rsrctype web user David.

This operation has to be done for each set of resource names and resource access credentials whether by ivadmin or by ivconsole commands. That is, the process is extremely laborious regardless whether the system administrators carrying out the task use command line entries or a GUI system for making the entries.

The initial roll-out and subsequent maintenance for a SSO solution for a large organization where there are potentially hundreds of thousands of existing users, each with multiple ids and passwords, each mapping to many resources on many different systems, all which are to be brought under the umbrella of a single user sign-on, may require many system administrators working many hours. Also, the end users may not feel comfortable divulging to another person their ID's and passwords on different systems. In fact, many organizations maintain general policies against users divulging passwords.

In present art there is no organized way for user themselves, as opposed to system administrators, to administer their own mappings of SSO IDs to system resources. It would be advantageous, in order to offload the crushing burden of SSO administration from system administrators, if there were a way for users themselves to perform their own SSO administration, including creating mappings from an SSO ID to system resources, updating such mappings, and deleting such mappings.

SUMMARY OF THE INVENTION

Exemplary embodiments of the invention typically include methods for directory enabled, self service, single sign on user account management, in which the methods are implemented in conjunction with a directory. In exemplary embodiments, the directory typically includes resource directory entries and user directory entries. Exemplary embodiments typically include receiving, from a user through a browser, an SSO user ID and SSO password of the user, the SSO password being known only to the user, and retrieving from the directory, in dependence upon the SSO user ID and SSO password, a user directory entry for the user, in which the user directory entry includes a mapped resource list including resource names of resources mapped to the user's SSO user ID.

Exemplary embodiments of the invention typically include creating, in dependence upon the user directory entry, a new mapping of a resource to the SSO user ID. In exemplary embodiments, the creating typically includes retrieving from the directory a full resource list including resource names of all resources available for SSO mappings, and deleting from the full resource list the resource names in the mapped resource list, thereby yielding an available resource list of resources presently available for mapping to the SSO user ID. In some embodiments, the creating includes displaying to the user through the browser the available resource list, and receiving a user's chosen resource name from the available resource list displayed to the user, including resource security data for the chose resource name. In other embodiments, the creating includes amending the user directory entry to include the chosen resource name and the resource security data for the chosen resource name, and storing the amended user directory entry in the directory.

In exemplary embodiments, the resource security data typically includes a resource user ID. In some embodiments, the resource security data includes a resource password. Exemplary embodiments typically include updating mappings of resources to the SSO user ID. In exemplary embodiments, the updating typically includes creating, in dependence upon the mapped resource list, an update resource list comprising resource names and resource security data of resources mapped to the user's SSO user ID, and displaying to the user through the browser, in a editable format, the update resource list. In some embodiments, the updating typically includes receiving user changes in resource security data of a resource in the update resource list displayed to the user, amending the user directory entry to include the user changes, and storing the amended user directory entry in the directory.

Exemplary embodiments of the invention typically include deleting mappings of resources to the SSO user ID. In exemplary embodiments, the deleting typically includes creating, in dependence upon the mapped resource list, a deletion resource list comprising resource names of resources mapped to the user's SSO user ID, and displaying, to the user through the browser, in a markable format, the deletion resource list. In some embodiments, the deleting typically includes receiving from the user a resource name of a resource marked for deletion from mappings to the user's SSO user ID, amending the user directory entry to exclude the resource name and resource security data for the resource marked for deletion, and storing the amended user directory entry in the directory.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
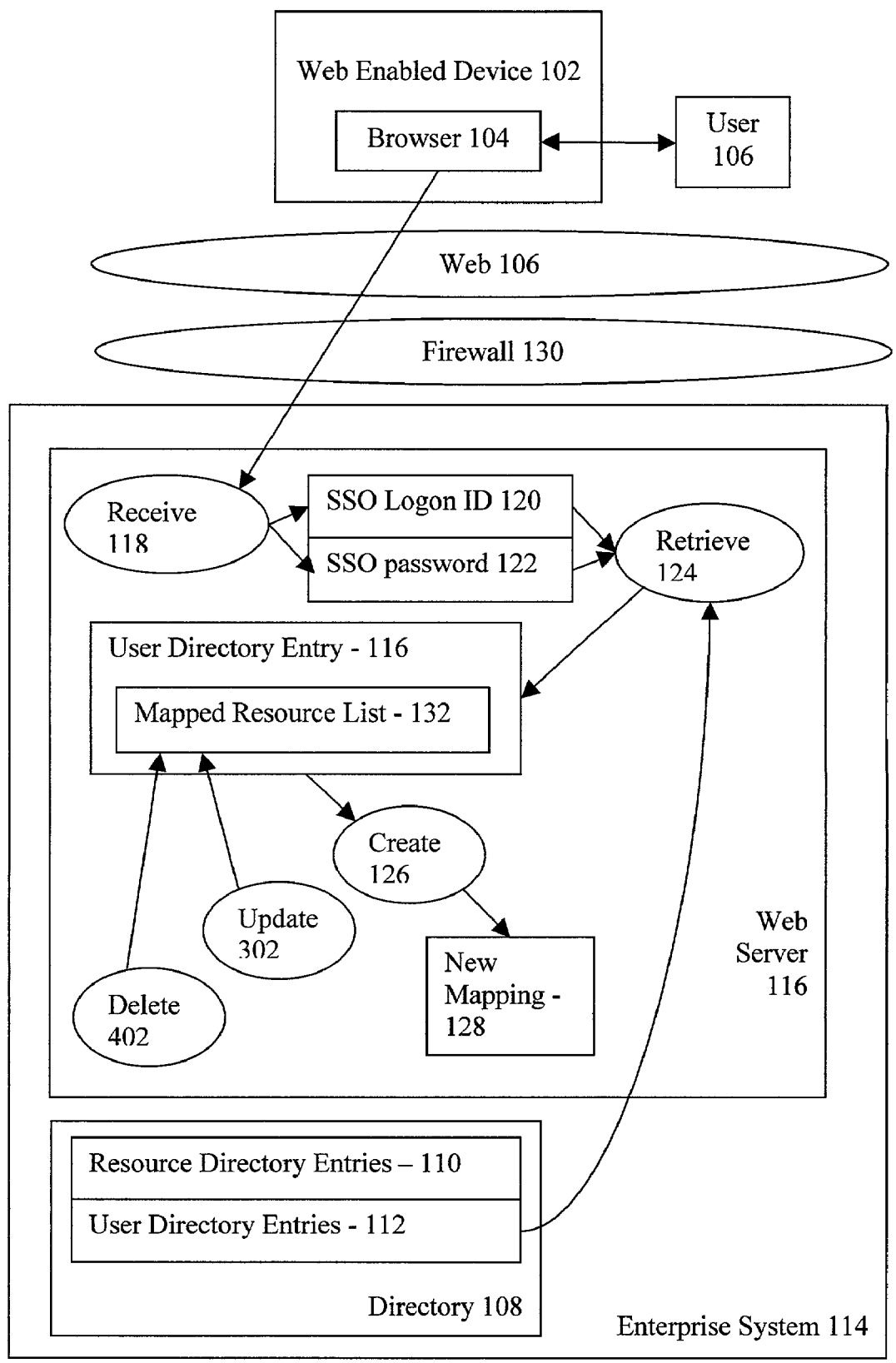
FIG. 1 is a control flow diagram illustrating operation and structure of an exemplary embodiment of the invention.

The present invention is described to a large extent in this specification in terms of methods for directory enabled, self service, single sign on user account management. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute," unless the context indicates otherwise, generally are used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects." Aggregates of records are referred to as "tables" or "files." Aggregates of files are referred to as "databases." Because so much data communications in the scope of the present invention is oriented to the web, it is worthwhile to point out that 'files' or "data files" in this specification include all browser-oriented markup documents including HTML documents, WML documents, HDML documents, XML documents, and the like, as well as text documents, word processing documents, spreadsheets, database records, graphic image files, video clips, audio files, JPEG files, MPEG files, MP3 files, and so on.

"Access credentials," or often simply "credentials," refers to user IDs and passwords required for access to resources. Accessing some resources requires only a user ID or a password. Many resources require both.

"Browser" means a web browser, a software application for locating and displaying web pages. Browsers typically comprise both a markup language interpreter, web page display routines, and an HTTP communications client. Typical browsers today can display text, graphics, audio and video. Browsers are operative in web-enabled devices, including wireless web-enabled devices, including many hand-held devices. Browsers in wireless web-enabled devices often are downsized browsers called "microbrowsers." Microbrowsers in wireless web-enabled devices often support markup languages other than HTML, including for example, the Wireless Markup Language ("WML") and the Handheld Device Markup Language ("HDML"). Microbrowsers supporting WML, for example, also often support the Wireless Access Protocol ("WAP"), a secure specification particulary directed to wireless handhelds such as mobile phones, pagers, two-way radios, smart phones, and communicators.

"Coupled for data communications" means any form of data communications, wireless, infrared, radio, internet protocols, HTTP protocols, email protocols, networked, direct connections, dedicated phone lines, dial-ups, and other forms of data communications as will occur to those of skill in the art.

A "directory," as the term is used in this specification, is a kind of database that tends to contain descriptive, attribute-based information. The information in a directory is generally read much more often than it is written. As a consequence, directories don't usually implement the complicated transaction or roll-back schemes regular databases use for doing high-volume complex updates. Directory updates are typically simple all-or-nothing changes, if they are allowed at all. Directories are tuned to give quick-response to high-volume lookup or search operations. They may have the ability to replicate information widely in order to increase availability and reliability, while reducing response time. When directory information is replicated, temporary inconsistencies between the replicas maybe acceptable to an extent not permitted in regular databases.

A "directory service" is a software access interface for a directory. There are many different ways to provide a directory service. Different methods allow different kinds of information to be stored in the directory, place different requirements on how that information can be referenced, queried and updated, how it is protected from unauthorized access, and so on. Some directory services are local, providing service to a restricted context, such as, for example, a the finger service on a single machine. Other directory services are global, providing service to a much broader context, such as, for example, the Domain Name Service for the entire Internet. Global services are usually 'distributed,' meaning that the data they serve is spread in directory storage across many machines, all of which cooperate to provide a global directory service. Typically a global directory service defines a uniform namespace which gives the same view of the data no matter a requesting user is located in relation to the data itself.

"JNDI" refers to the Java Naming and Directory Interface™, an application programming interface ("API") that provides naming and directory functionality to applications written in the Java™ programming language. JNDI operates independently of any specific directory service implementation, so that a variety of directories can be accessed in a common way. The JNDI architecture consists of an API and a service provider interface ("SPI"). Java applications use the JNDI API to access a variety of naming and directory services. The SPI enables a variety of naming and directory services to be plugged in transparently, thereby allowing the Java application using the JNDI API to access their services. Naming and directory services operable with JNDI include various file systems as well as the directory services based upon the Lightweight Directory Access Protocol ("LDAP"), the Internet's Domain Name Service ("DNS"), implementations of the Network Information System ("NIS"), the Novell Directory Service ("NDS"), the Java Remote Method Invocation Registry ("RMI"), and the Common Object Request Broker Architecture ("CORBA"), and Enterprise JavaBeans ("EJB"). Readers interested in knowing more about JNDI are directed to Sun Microsystems' JNDI tutorial at http://java.sun.com/products/jndi/tutorial/.

"LDPA" refers to the Lightweight Directory Access Protocol, a set of protocols for accessing information directories. LDAP is based on the standards contained within the X.500 standard, but is significantly simpler. And unlike X.500, LDAP supports tcp/ip, an important feature for Internet-oriented directory access.

A "resource" is anything amenable to access controls in or coupled for data communication to a computer system, including aggregations of computers coupled for data communications in a network. Examples of resources include data files, printers, computer systems other than a user's default domain, and communications links and logon access to other systems, subsystems, or domains, and access to application programs installed on such systems. Data files and printers may have associated user ID or password protection, but, even if they do not, accessing them may require cross-domain communications with servers that do. Computers and servers other than a user's default domain are computers for which a user needs an additional user ID and password for access. Application programs installed on such systems often require an additional user ID or password for access. Embodiments of the present invention administer such additional user IDs and passwords through use of an SSO ID. An "SSO resource" is a resource listed in a directory as available for SSO mapping. In this specification, it is usual to assume that all resources under discussion are SSO resources. Cross-domain servers supporting resources or supporting access controls for resources are sometimes referred to in this specification as "back-end servers."

A "URI" or "Universal Resource Identifier" is an identifier of a named object in any namespace accessible through a network. URI are functional for any access scheme, including for example, the File Transfer Protocol or "FTP," Gopher, and of course the "web," the "World Wide Web." "URLs" or "Universal Resource Locators" comprise a kind of subset of URIs, wherein each URL resolves to a network address. That is, URIs and URLs are distinguished in that URIs identify named objects in namespaces, where the names may or may not resolve to addresses, while URLs do resolve to addresses. Although standards today are written on the basis of URIs, it is still common to see web-related identifiers, of the kind used to associate web data locations with network addresses for data communications, referred to as "URLs." In this specification, we refer to such identifiers generally as URIs.

"World Wide Web," or more simply "the web," refers to a system of internet protocol ("IP") servers that support specially formatted documents, documents formatted in markup languages such as HTML, XML, WML, or HDML. The term "Web" is used in this specification also to refer to any server or connected group or interconnected groups of servers that implement hypertext links through protocols supporting such links, including the Wireless Access Protocol ("WAP") and the HyperText Transport Protocol ("HTTP"), in support of URIs and distribution of documents in markup languages, regardless whether such servers or groups of servers are coupled to the World Wide Web as such. "Web server" refers to any such server in any such network.

"X.500" is an ISO and ITU standard defining structure for global directories. X.500 directories are hierarchical with different levels for each category of information, such as country, state, and city.

DETAILED DESCRIPTION

Embodiments of the present invention, the exemplary mapping applications as described in this specification, allow users to provide self service in mapping resource credential to SSO IDs. Using embodiments of the present invention, users utilize this SSO IDs to manage links to existing resource IDs & passwords on systems located anywhere. As a result, a mapping application based on this method allows the user to consolidate IDs on different systems under an SSO ID. Exemplary embodiments of the present invention, example mapping applications for mapping system resources to SSO IDs, are generally described in this specification as using Java Servlets and Java Server Pages ("JSP"), running on IBM WebSphere Application Servers, and using the Java Naming and Directory Interface ("JNDI") Application Programming Interface ("API") querying a Lightweight Directory Access Protocol ("LDAP") directory. Other embodiments will utilize C++ or Visual Basic front ends with back ends that include CORBA objects or an X.500 directory service. In fact, persons of skill in the art will think of many ways to implement directory services, user interfaces, and data communications for various embodiments of methods, systems, and products of the present invention, and all such ways are well within the scope of the invention.

Turning now to FIG. 1, exemplary embodiments of the invention are shown as methods for directory enabled, self service, single sign on ("SSO") user account management. In exemplary embodiments, the method is implemented in conjunction with a directory (108), and the directory typically includes resource directory entries (110) and user directory entries (112). Exemplary embodiments typically include receiving (118), from a user (106) through a browser (104), an SSO user ID (120) and SSO password (122) of the user (106), the SSO password being known only to the user, and retrieving (124) from the directory (108), in dependence upon the SSO user ID (120) and SSO password (122), a user directory entry (116) for the user, wherein the user directory entry includes a mapped resource list (132) comprising resource names of resources mapped to the user's SSO user ID. Exemplary embodiments typically include creating (126), in dependence upon the user directory entry (116), a new mapping (128) of a resource to the SSO user ID.

Figure 2:
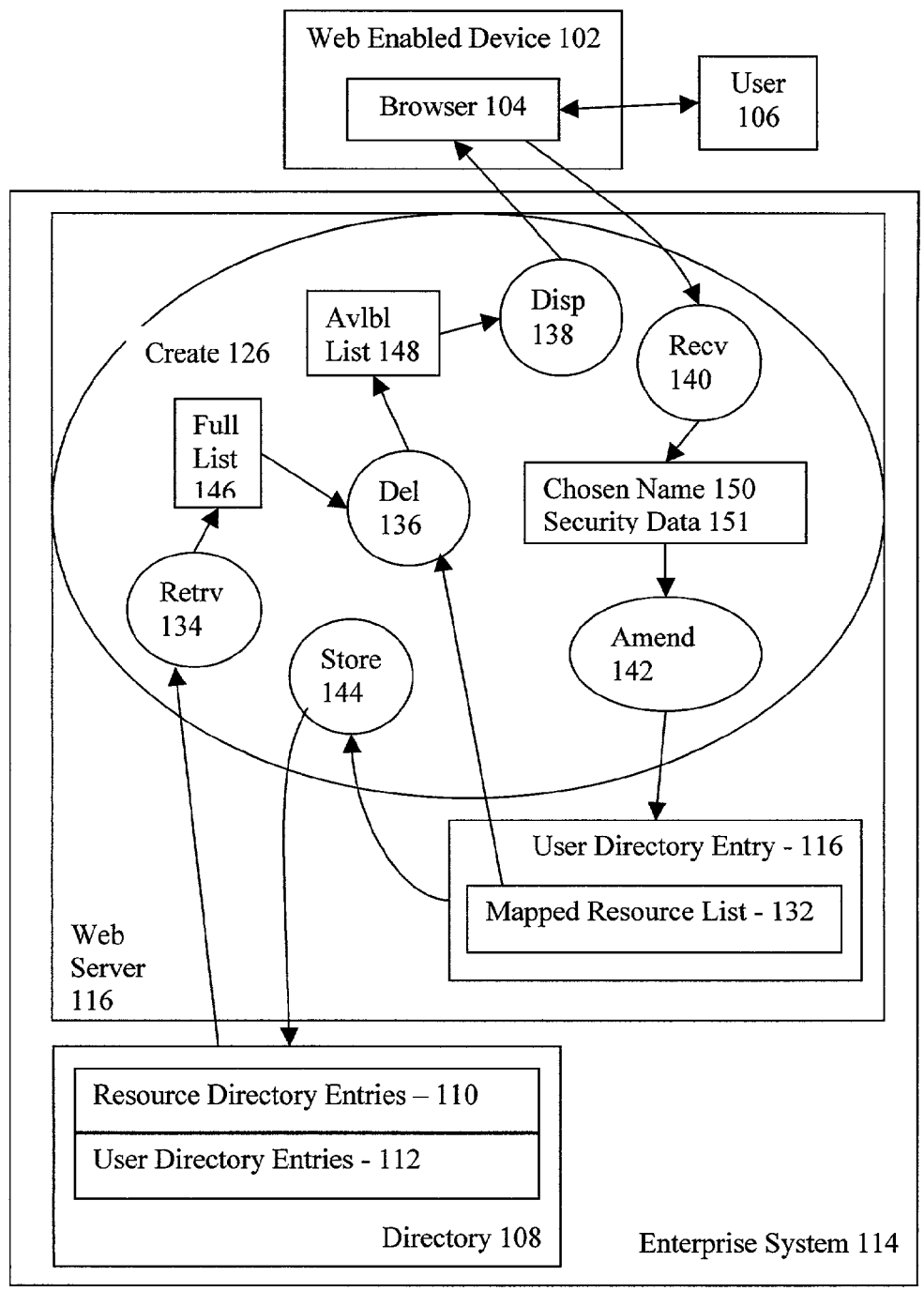
FIG. 2 is a control flow diagram of the process of creating an SSO mapping in an exemplary embodiment of the invention.

In exemplary embodiments of the kind illustrated in FIG. 2, the creating (126) typically includes retrieving (134) from the directory (108) a full resource list (146) including resource names of all resources available for SSO mappings, and deleting (136) from the full resource list (146) the resource names in the mapped resource list (132), thereby yielding an available resource list (148) of resources presently available for mapping to the SSO user ID. In some embodiments, the creating typically includes displaying (138) to the user (106) through the browser (104) the available resource list (148), and receiving (140) a user's chosen resource name (150) from the available resource list displayed to the user, including resource security data for the chose resource name (151). In other embodiments, the creating typically includes amending (142) the user directory entry (116) to include the chosen resource name (150) and the resource security data for the chosen resource name (151), and storing (144) the amended user directory entry (116) in the directory (108).

In exemplary embodiments of the kind illustrated in FIG. 2, the resource security data (151) typically includes a resource user ID. In some embodiments, the resource security data (151) typically includes a resource password.

Figure 3:
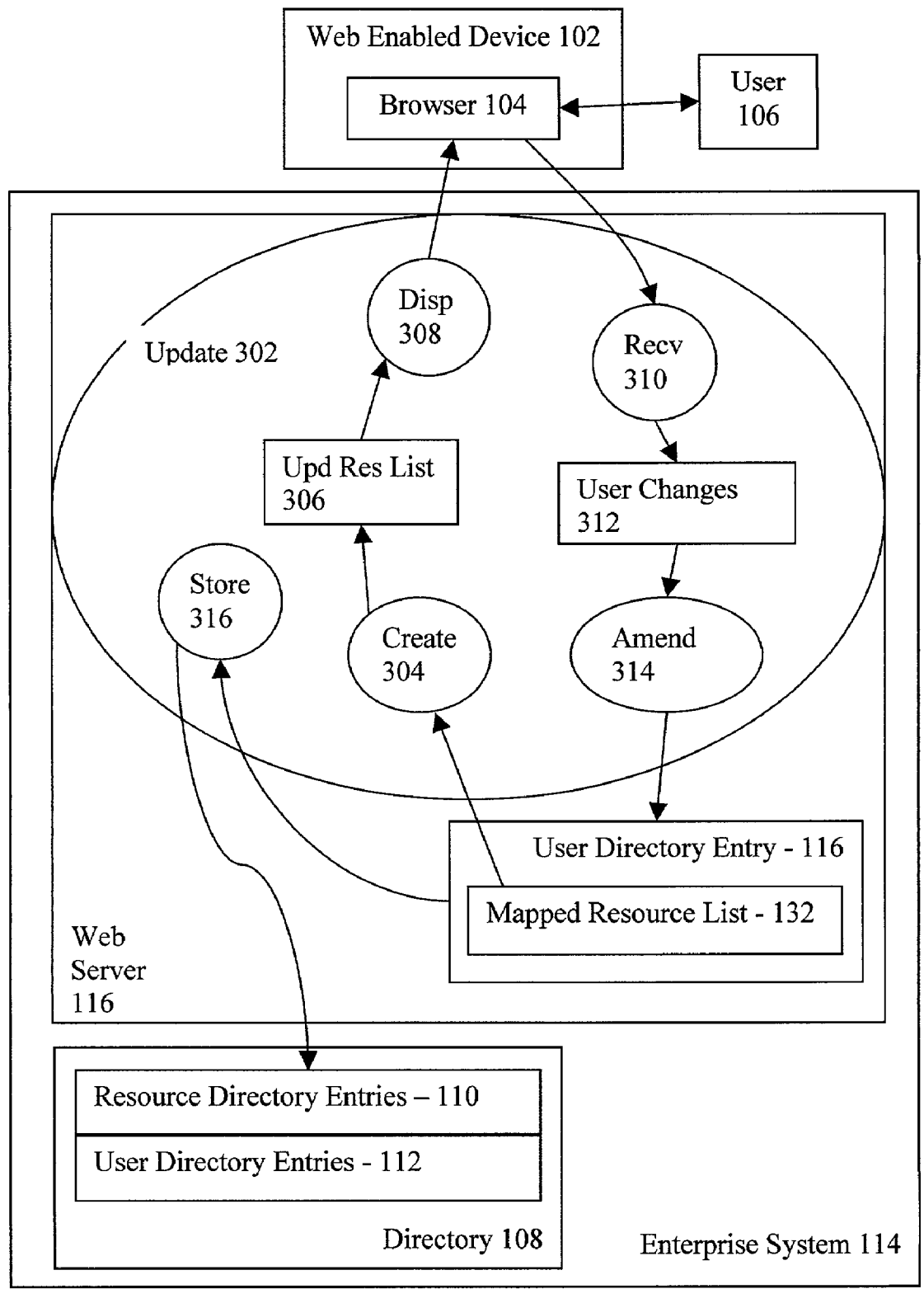
FIG. 3 is a control flow diagram of the process of updating an SSO mapping in an exemplary embodiment of the invention.

Turning now to FIG. 3, further exemplary embodiments of the invention are illustrated as including updating (302) mappings of resources to the SSO user ID. In such embodiments, the updating typically includes creating (304), in dependence upon the mapped resource list (132), an update resource list (306) comprising resource names and resource security data of resources mapped to the user's SSO user ID. Embodiments of the kind shown in FIG. 3 typically include displaying (308) to the user (106) through the browser (104), in a editable format, the update resource list (306), and receiving (310) user changes (312) in resource security data of a resource in the update resource list displayed to the user. In such embodiments, updating typically includes amending (314) the user directory entry (116) to include the user changes (312), and storing (316) the amended user directory entry in the directory (108).

Figure 4:
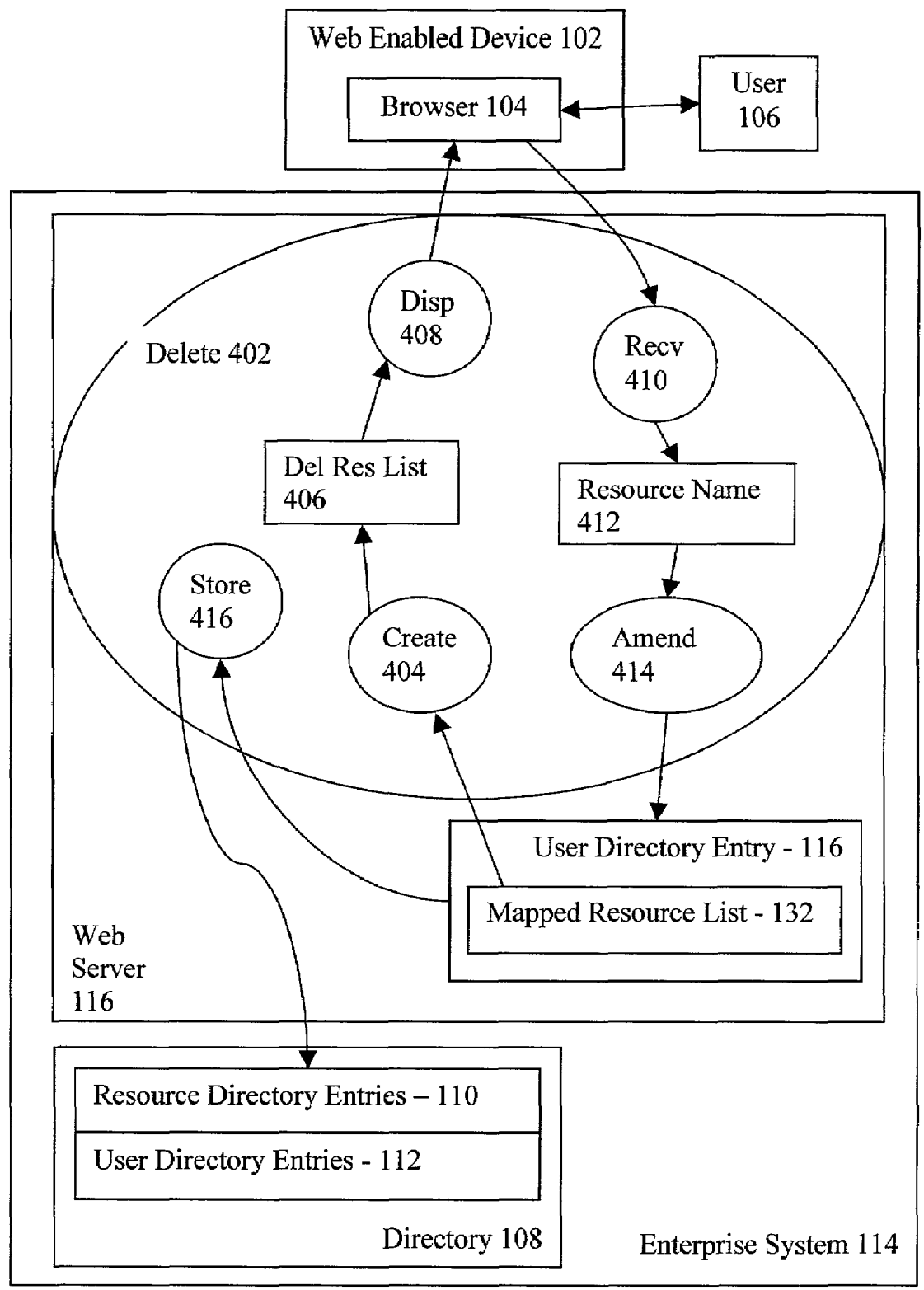
FIG. 4 is a control flow diagram of the process of deleting an SSO mapping in an exemplary embodiment of the invention.

Turning now to FIG. 4, further exemplary embodiments of the invention are shown typically to include deleting (402) mappings of resources to the SSO user ID, in which the deleting typically includes creating (404), in dependence upon the mapped resource list (132), a deletion resource list (406) comprising resource names of resources mapped to the user's SSO user ID. In embodiments of the kind shown in FIG. 4, the deleting typically includes displaying (408), to the user (106) through the browser (104), in a markable format, the deletion resource list (406), and receiving (410) from the user a resource name (412) of a resource marked for deletion from mappings to the user's SSO user ID. In such embodiments, the deleting typically includes amending (414) the user directory entry (116) to exclude the resource name and resource security data for the resource marked for deletion, and storing (416) the amended user directory entry in the directory (108).

By way of further explanation of the structure and operation of embodiments of the invention, we present a discussion of an example embodiment, a mapping application developed in Java, presenting as an application front-end user interface screens to browsers, using JNDI, LDAP, and the IBM PD/Webseal server. Various embodiments of the invention will naturally use different programming languages for the front-end including, for example, C, C++, or Visual Basic. Various embodiments of the invention will use methods of directory access other than JNDI, including for example, the C-language interface for LDAP described by the Internet Engineering Task Force in Request For Comment number RFC1823. Various embodiments of the invention will utilize an X.500 directory, or some other directory system, rather than LDAP. Persons of skill in the art will think of still other ways to implement mapping application front-ends, directory interfaces, and directory service for directory-enabled SSO mappings, and all such ways are well within the scope of the present invention. This specification's use of a Java front-end, a JNDI interface to the directory system, and an LDAP directory system is intended for explanation, not for limitation.

The example mapping application prompts the user for an SSO ID and password and calls a method named ValidateIRID to query an LDAP server to get the user's Distinguished Name (userDN) based on the entered SSO ID. A distinguished name ("DN") is composed of a sequence of LDAP entry attributes separated by commas. For example DN cn=Mike Smith, ou=Austin, c=US represents a directory entry for a person with the common name (cn) Mike Smith under the organizational unit (ou) Austin in the organization (o) IBM in the country (c) US.

On the basis of the DN, the mapping application attempts to create a JNDI context object. The single parameter of the context object is a property object called 'pr' which contains the following information: the Java package name, the userDN, the password, and an LDAP server full path name including a port number. If the context object is successfully created, that is, the user's SSO credentials are valid, then the user is presented a user interface screen, referred to in this example as a 'Link ID Screen,' making available the functions of creating, updating, and deleting SSO mappings. If the context object is not successfully created, that is, user's credentials are not valid, the user will be asked to re-enter the SSO ID and password.

When the user selects, from the Link ID Screen, the function for creating a new mapping, the example mapping application performs the following logic before proceeding to display an additional screen for data entry for a new mapping, the additional screen being referred to in this example as the 'Create Link Screen.' The example mapping application uses a method called getTargetRecords(pdUserid) to retrieve all the SSO resources defined in the LDAP server for the particular userDN and store the returned values in s string array named 'credentials.'

The SSO resources have resource names corresponding to junction names defined in IBM SecureWay Policy Director (PD). A further example method known as LDAPSearch.getFullFilteredSearchResultsVector( )will return the SSO resource names for resources already mapped based on the userDN.

The unmapped resources are then calculated and returned in method getTargetServicesFiltered( ), and the list of unmapped resources are displayed in the user's browser. Once the Create Link Screen is displayed, the user uses usual data entry fields to select a resource for mapping and creating a new mapping in the LDAP entry for the user's distinguished name by entering the selected resource name and password to associate with the LDAP entry identified by the user's SSO user ID.

From the user's point of view, after logging on the mapping application by providing the user's SSO user ID and password, the process of creating a new mapping of a resource to the user's SSO user ID proceeds in this example as follows: The user clicks on the a GUI button appropriately labeled, "Create New Mapping" for example, on the main page of the mapping application. User chooses a resource name for which a new mapping is intended, making the choice from a drop-list box in the Create Link Screen. Note that only the resources that do not have defined mappings to the subject SSO ID appear in this drop-list box. The user is prompted for and enters the user's user ID for the resource or back-end server user ID and password for accessing the resource to be mapped. The user clicks a GUI button marked, for example, "Submit." The user ID and password are verified with the back-end server for the newly mapped resource, and the new mapping is entered with the user's entry in the LDAP. The user is presented with a confirmation message through the browser.

In the example described, when the user clicks the "Submit" button, the system carries out the following logic before displaying the confirmation message. The getDN( ) method is invoked to retrieve a userDN based on the user's entered SSO user ID. If the userDN exists, it will add the resource name and password to the userDN string and store the newly amended userDN string into the LDAP directory. The resource ID and password will be verified by invoking the getDN( ) method again with the newly mapped resource data as parameters. More specifically, the following pseudocode illustrates a method of creating new mappings useful with various embodiments of the present invention:

```
private String[] getTargetServicesFiltered( )
{
    Hashtable ht = new Hashtable( );
    String[] attrIDs = {"tsName"};
    String selections[] = null;
    try
    {
        // Get user's already defined SSO mappings
        String credentials[] = getTargetRecords(pdUserid);
        // Pull into hash table all SSO resources for entire system
        Vector results =
        LDAPSearch.getFullFilteredSearchResultsVector(gsoSuffix);
            if (results.size( ) > 0)
            {
                selections = new String[results.size( )];
                for (int j = 0; j < results.size( ); j++)
                {
                    String value = ((String[]) results.elementAt(j))[1];
                    ht.put(value, value);
                }
```

```
            }
            // Remove from the hash table the user's already
            // defined SSO mappings, first testing whether the
            // user had in fact already mapped SSO resources
            if (credentials != null)
            {
                // If hashtable contains a defined SSO mapping,
                // then it needs to be excluded from the display
                // list in the Create Link Screen
                for (int j = 0; j < credentials.length; j++)
                    if (ht.containsKey(credentials[j]))
                        ht.remove(credentials[j]);
            }
            //Generate selection list
            if (ht.size( ) > 0)
            {
                // If one or more SSO resources or 'TargetServices'
                // are available, put them into a String array
                selections = new String[ht.size( )];
                int j = 0;
                for (Enumeration e = ht.elements( ); e.hasMoreElements( );)
                {
                    String resource = (String) e.nextElement( );
                    selections[j++] = resource;
                }
            } else selections = null;
        } //end try
        catch (Exception e) e.printStackTrace( );
        // return list of available eTargetServices
        return selections;
}
```

As shown in the example pseudocode, the getTargetServicesFiltered( ) method returns an array of string containing unmapped resource names. In this example, SSO resources are sometimes referred to as 'eTargetServices.' The getTargetRecords(pdUserid) method is invoked to return all the SSO's resource names defined in the LDAP server for that particular userDN and store the returned values in a string array named 'credentials.' The method LDAPSearch.getFullFilteredSearchResultsVector(gsosuffix) returns the all the SSO's resource names system wide which are already mapped based on the userDN. Next a for loop is iterated to remove all mapped resource names so the getTargetServicesFiltered( ) method will only return unmapped resource names.

Typical operation of the example method getTargetRecords( ) is illustrated in the following pseudocode:

ID. The return value from getTargerRecords( ) is an array of string named 'selections.' The LDAP API LDAPConnection.connect(ldapHost, "389") is invoked to connect to the LDAP server with two parameters, hostname=ldapHost and port#=389. A distinguished name (dn) is returned from the LDAP server using the method getDN( ). A dn is composed of a sequence of LDAP entry attributes separated by commas. For example dn cn=Mike Smith, ou=Austin, c=US represents a directory entry for a person with the common name (cn) Mike Smith under the organizational unit (ou) Austin in the organization (o) IBM in the country (c) US. The JNDI API call to LDAPSearch.getFullFilteredSearchResultsVector( ) is made with a distinguished name, 'dn,' as a parameter to search for a list of resource names

```
private String[]getTargetRecords(String userid)
{
        int j=0;
        String selections[] = null;
        int connectRC = LDAPConnection.connect(ldapHost, "389");
        String dn = getDN(userid);
        Vector results = LDAPSearch.getFullFilteredSearchResultsVector(dn);
        if (results.size( ) > 0)
        {
            selections = new String[results.size( )];
            for (j = 0; j < results.size( ); j++)
                selections[j] = ((String[]) results.elementAt(j))[1];
        }
        return selections;
}
```

More particularly, as shown in the example pseudocode for getTargetRecords( ), the input to getTargetRecords( ) is a string which contains userid, that is, the user's SSO user associated with this user's distinguished name and store the returned resource names in the string array named 'selections.'

As described above, the example method getDN( ) is called with the user's SSO user ID as a parameter and return the user's distinguished name from an LDAP directory. The getDN( ) method uses the SSO user ID as a search parameter to find a corresponding distinguished name in the LDAP directory. Typical operation of the example method getDN( ) is illustrated in more detail by the following pseudocode:

```
private String getDN(String userid)
{
    String[] attrIDs = 55 "uid"};
    String dn = null;
    //Set option for "ivadmin" cmd to search
    String filter = "(&(objectclass=ePerson)(uid=" + userid + "))";
    //filter = (& (objectclass=ePerson)(uid=<userid>))
    Vector results = LDAP Search.getFullFilteredSearchResultsVector(gsoSuffix,
    filter, attrIDs, ctx);
    if (results.size( ) > 0) dn = ((String[]) results.elementAt(0))[0];
    if(dn == null)return null; //If not found "dn" based on "userid"
    else return dn + ","+gsoSuffix;
}
```

More particularly, as shown in the example pseudocode for getDN( ), the getDN( ) method will pass the userid (the user's SSO user ID) as a string search key and return the distinguished name for that userid as a string from the LDAP directory. The parameters for the API call to LDAPSearch.getFullFilteredSearchResultsVector( ) are gsosuffix, filter, attrIDs, and ctx. The value for 'geoSuffix' is obtained from the Init Method. Its value is normally equal to 1=world (one of the attributes of the distinguished name). 'Filter' is the cast conversion of userid string type to ePerson type. 'AttrIDs' is one of the attributes of the Ids. It normally has one of the values in this set: 'uid,' 'secactValid,' 'objectclasname,' 'secretkey.' 'Ctx' is static variable of DirContext object type. Ctx's value is obtained from this API call:
    ctx=LDAPConnection.getDirContext( );
which returns the whole context from the LDAP server database, including the host name, connection port, and so on.

When the user selects, from the Link ID Screen, the function for updating a mapping, the example mapping application performs the following logic before displaying an "Update Link Screen" for data entry for edits of an existing mapping. The example mapping application retrieves a list of all resources that the user had already mapped using the method getTargetRecords(String userid) to get all the SSO resources defined in the LDAP server for the particular userDN, store the returned values in a string array, and display the returned values to the user. In this example, the SSO resources are resource names corresponding to junction names defined in the IBM SecureWay Policy Director (PD).

The user selects through the browser GUI one of the displayed resources for updating. When the user selects the resource for updating, the Update Link Screen is refreshed to display editable text boxes for the resource user Id and password associated with the chosen resource. Now user can change the resource user ID or password or both by changing the values in the text boxes and clicking on the submit button. When the user thus submits edited update data, the mapping application issues calls to JNDI member methods to update the LDAP entry for the user's SSO user ID to include the resource user ID and password as edited by the user. If the user credentials are successfully updated, a confirmation message is displayed. If the update fails, an error message is displayed. More particularly, the following pseudocode illustrates an example procedure, useful with various embodiments of the present invention, for updating LDAP entries with edited resource user IDs and passwords.

```
Private boolean updateTargetRecord(String userid, String password)
{
        String dn = (String) session.getValue("dn");
        Hashtable ht = new Hashtable( );
        // set uid value
        String[] uid = new String[1];
        uid[0] = userid;
        ht.put("uid", uid);
        // set secretkey value
        String[] secretkey = new String[1];
        secretkey[0] = password;
        ht.put("secretkey", secretkey);
        if (LDAPUtilityObjects.updateObject(dn, ht, ctx) == 0)
            return true;
        else
    {
        System.err.println("updateTargetRecord: "+LDAPUtilityObjects.getError( ));
        return false;
    }
}
```

If the user selects, from the Link ID Screen, the function for deleting a mapping, the example mapping application performs the following logic, before displaying a 'delete Link Screen.' The mapping application retrieves all SSO resources already mapped to the user's SSO user ID. The mapping application uses the method getTargetRecords (String userid), described in detail above in this specification, to return all the SSO resources defined in the LDAP server for that particular userDN, store the returned values in a string array, and display them to the user through the browser's GUI. The SSO resources in this example have resource names corresponding to junction names defined in the IBM SecureWay Policy Director (PD). The user selects a resource from the displayed list, clicks a GUI button labeled "Delete" (or double-clicks the list entry), and the mapping application performs the processing illustrated by the following pseudocode to delete the mapping of the selected resource to the user's SSO user ID. If the resource SSO mapping is deleted successfully, then a confirmation message is displayed to the user. If the deletion fails, an error message is displayed. More particularly, the following pseudocode illustrates an example procedure, useful with various embodiments of the present invention, for deleting user-selected LDAP entries.

```
Private boolean deleteTargetRecord(String pdUserid, resource)
{
    String dn = getDN(pdUserid);
    if (dn != null)
    {
        dn = "cn=T:" + resource + ",cn=" + pdUserid + "," + dn;
        if (LDAPUtilityObjects.deleteObject(dn, ctx) == 0) return true;
        else    System.err.println("deleteTargetRecord: " +
            LDAPUtilityObjects.getError( ));
    }
    else
    {
        System.err.println("deleteTargetRecord: Can't get user's dn");
        return false;
    }
}
```

It will be understood from the foregoing description that various modifications and changes may be made, and in fact will be made, in the exemplary embodiments of the present invention without departing from its true spirit. The descriptions in this specification are for purposes of illustration only and are not to be construed in a limiting sense. The scope of the present invention is limited only by the language of the following claims.

What is claimed is:

1. A method for directory enabled, self service, single sign on user account management, the method implemented in conjunction with a directory, the directory comprising resource directory entries and user directory entries, the method comprising the steps of:
    receiving, from a user through a browser, an SSO user ID and SSO password of the user, the SSO password being known only to the user;
    retrieving from the directory, in dependence upon the SSO user ID and SSO password, a user directory entry for the user, wherein the user directory entry includes a mapped resource list comprising resource names of resources mapped to the user's SSO user ID;
    creating, in dependence upon the user directory entry, a new mapping of a resource to the SSO user ID, wherein the creating comprises the further steps of:
        retrieving from the directory a full resource list comprising resource names of all resources available for SSO mappings;
        deleting from the full resource list the resource names in the mapped resource list, thereby yielding an available resource list of resources presently available for mapping to the SSO user ID;
        displaying to the user through the browser the available resource list;
        receiving a user's chosen resource name from the available resource list displayed to the user, including resource security data for the chose resource name;
        amending the user directory entry to include the chosen resource name and the resource security data for the chosen resource name; and
        storing the amended user directory entry in the directory.

2. The method of claim 1 wherein the resource security data includes a resource user ID.

3. The method of claim 1 wherein the resource security data includes a resource password.

4. The method of claim 1 further comprising updating mappings of resources to the SSO user ID, where the updating comprises the further steps of:
    creating, in dependence upon the mapped resource list, an update resource list comprising resource names and resource security data of resources mapped to the user's SSO user ID;
    displaying to the user through the browser, in a editable format, the update resource list;
    receiving user changes in resource security data of a resource in the update resource list displayed to the user;
    amending the user directory entry to include the user changes; and
    storing the amended user directory entry in the directory.

5. The method of claim 1 further comprising deleting mappings of resources to the SSO user ID, where the deleting comprises the further steps of:
    creating, in dependence upon the mapped resource list, a deletion resource list comprising resource names of resources mapped to the user's SSO user ID;
    displaying, to the user through the browser, in a markable format, the deletion resource list;
    receiving from the user a resource name of a resource marked for deletion from mappings to the user's SSO user ID;
    amending the user directory entry to exclude the resource name and resource security data for the resource marked for deletion; and
    storing the amended user directory entry in the directory.

6. A system for directory enabled, self service, single sign on user account management, the system implemented in conjunction with a directory, the directory comprising resource directory entries and user directory entries, the system comprising:
    means for receiving, from a user through a browser, an SSO user ID and SSO password of the user, the SSO password being known only to the user;
    means for retrieving from the directory, in dependence upon the SSO user ID and SSO password, a user directory entry for the user, wherein the user directory entry includes a mapped resource list comprising resource names of resources mapped to the user's SSO user ID;

means for creating, in dependence upon the user directory entry, a new mapping of a resource to the SSO user ID, wherein the means for creating comprises:

means for retrieving from the directory a full resource list comprising resource names of all resources available for SSO mappings;

means for deleting from the full resource list the resource names in the mapped resource list, thereby yielding an available resource list of resources presently available for mapping to the SSO user ID;

means for displaying to the user through the browser the available resource list;

means for receiving a user's chosen resource name from the available resource list displayed to the user, including resource security data for the chose resource name;

means for amending the user directory entry to include the chosen resource name and the resource security data for the chosen resource name; and means for storing the amended user directory entry in the directory.

7. The system of claim 6 wherein the resource security data includes a resource user ID.

8. The system of claim 6 wherein the resource security data includes a resource password.

9. The system of claim 6 further comprising means for updating mappings of resources to the SSO user ID, where the updating comprises:

means for creating, in dependence upon the mapped resource list, an update resource list comprising resource names and resource security data of resources mapped to the user's SSO user ID;

means for displaying to the user through the browser, in a editable format, the update resource list;

means for receiving user changes in resource security data of a resource in the update resource list displayed to the user;

means for amending the user directory entry to include the user changes; and means for storing the amended user directory entry in the directory.

10. The system of claim 6 further comprising means for deleting mappings of resources to the SSO user ID, where the deleting comprises:

means for creating, in dependence upon the mapped resource list, a deletion resource list comprising resource names of resources mapped to the user's SSO user ID;

means for displaying, to the user through the browser, in a markable format, the deletion resource list;

means for receiving from the user a resource name of a resource marked for deletion from mappings to the user's SSO user ID;

means for amending the user directory entry to exclude the resource name and resource security data for the resource marked for deletion; and means for storing the amended user directory entry in the directory.

11. A computer program product containing computer readable medium encoded with instructions for directory enabled, self service, single sign on user account management, the computer program product implemented in conjunction with a directory, the directory comprising resource directory entries and user directory entries, the computer program product comprising:

a recording medium;

means, recorded on the recording medium, for receiving, from a user through a browser, an SSO user ID and SSO password of the user, the SSO password being known only to the user;

means, recorded on the recording medium, for retrieving from the directory, in dependence upon the SSO user ID and SSO password, a user directory entry for the user, wherein the user directory entry includes a mapped resource list comprising resource names of resources mapped to the user's SSO user ID;

means, recorded on the recording medium, for creating, in dependence upon the user directory entry, a new mapping of a resource to the SSO user ID, wherein the means, recorded on the recording medium, for creating comprises:

means, recorded on the recording medium, for retrieving from the directory a full resource list comprising resource names of all resources available for SSO mappings;

means, recorded on the recording medium, for deleting from the full resource list the resource names in the mapped resource list, thereby yielding an available resource list of resources presently available for mapping to the SSO user ID;

means, recorded on the recording medium, for displaying to the user through the browser the available resource list;

means, recorded on the recording medium, for receiving a user's chosen resource name from the available resource list displayed to the user, including resource security data for the chose resource name;

means for amending the user directory entry to include the chosen resource name and the resource security data for the chosen resource name; and means, recorded on the recording medium, for storing the amended user directory entry in the directory.

12. The computer program product of claim 11 wherein the resource security data includes a resource user ID.

13. The computer program product of claim 11 wherein the resource security data includes a resource password.

14. The computer program product of claim 11 further comprising means, recorded on the recording medium, for updating mappings of resources to the SSO user ID, where the updating comprises:

means, recorded on the recording medium, for creating, in dependence upon the mapped resource list, an update resource list comprising resource names and resource security data of resources mapped to the user's SSO user ID;

means, recorded on the recording medium, for displaying to the user through the browser, in a editable format, the update resource list;

means, recorded on the recording medium, for receiving user changes in resource security data of a resource in the update resource list displayed to the user;

means, recorded on the recording medium, for amending the user directory entry to include the user changes; and means, recorded on the recording medium, for storing the amended user directory entry in the directory.

15. The computer program product of claim 11 further comprising means, recorded on the recording medium, for deleting mappings of resources to the SSO user ID, where the deleting comprises:

means, recorded on the recording medium, for creating, in dependence upon the mapped resource list, a deletion resource list comprising resource names of resources mapped to the user's SSO user ID;

means, recorded on the recording medium, for displaying, to the user through the browser, in a markable format, the deletion resource list;

means, recorded on the recording medium, for receiving from the user a resource name of a resource marked for deletion from mappings to the user's SSO user ID;

means, recorded on the recording medium, for amending the user directory entry to exclude the resource name and resource security data for the resource marked for deletion; and means, recorded on the recording medium, for storing the amended user directory entry in the directory.

* * * * *